Patented June 12, 1945

2,378,362

UNITED STATES PATENT OFFICE 2,378,362

STABLE AMINO PLASTIC SIRUPS AND PROCESSES OF PRODUCING SAME

Kurt E. Ripper, Bronxville, N. Y., assignor to American Cyanamid Company, New York, N. Y., a corporation of Maine No Drawing. Application August 8, 1940, Serial No. 351,915

11 Claims. (Cl. 260—42)

This invention relates to the production of stable, clear sirups containing amino plastic materials prepared by the reaction of amino compounds with aldehydes and it is especially directed to those materials containing melamine-aldehyde reaction products.

In the production of amino plastics for many purposes, it is desirable to have these products in the form of stable, clear sirups. With some of the amino plastic materials, such sirups have heretofore been commercially difficult or impossible to obtain. This is particularly true of compositions containing melamine-aldehyde condensation products, alone or in combination with other condensation products.

In my copending applications Serial Nos. 311,935, 328,741 and 331,161, I have described dicyandiamide - aldehyde condensation products modified by the inclusion of minor amounts of melamine-aldehyde condensation products and I have also pointed out some of the difficulties of preparing relatively stable sirups from these combinations. I have now found that these sirups, as well as others containing condensation products of melamine and an aldehyde, can be greatly improved by means of the present invention.

In accordance with my invention amino-aldehyde condensation products are prepared in the form of clear, stable sirups by incorporating therein a melamine-aldehyde hydrophilic sol which apparently acts as a protective colloid for the amino-aldehyde condensation products present. The production of stable sirups by means of melamine-aldehyde hydrophilic sols is very surprising in view of the fact that the hydrophilic sol alone tends to gelatinize if allowed to stand for any considerable period of time (about 2-13 days) at room temperature and in view of the fact that the amino-aldehyde sirups not prepared with the aid of the hydrophilic sols frequently tend to flocculate upon standing only a few days, whereas the amino-aldehyde condensation products prepared according to my invention with the aid of the hydrophilic sols are stable over long periods of time, e. g. around several months or more.

The following examples in which the proportions are in parts by weight are given by way of illustration and not in limitation. All of the pH values given in the examples have been obtained by determination with the glass electrode, but the values are not exactly critical except where so indicated. The formalin used in each instance is an aqueous solution containing 37% by weight of formaldehyde.

PREPARATION OF THE HYDROPHILIC SOLS

Example 1

To 220 parts of formalin 0.22 part of guanidine carbonate is added thereby adjusting the pH to 8.54. There are added 31.5 parts of melamine and the mixture is refluxed for sixty minutes. The pH value drops to 6.42 and the hydrophilic sol is ready for use in the production of clear, stable sirups containing amino plastic resins.

Example 2

220 parts of formalin are adjusted to a pH value of 6.42 by addition of 2.2 parts of 10% triethanolamine solution. 31.5 parts of melamine are added to the formalin. Immediately after the melamine is dissolved, the pH value is 6.60. The mixture is then refluxed for thirty minutes. At this stage a hydrophilic sol is formed which can be used for the purpose of the present invention. The pH value after the refluxing step is 6.57. If this hydrophilic sol is allowed to stand at room temperature, it will gel after about three days.

Example 3

By applying the same procedure as in Example 2 except that the product is refluxed for sixty minutes, a hydrophilic sol is obtained which gels after about seven days of storage. The pH value after the refluxing step is 6.53.

Example 4

If the refluxing step of Example 2 is prolonged to ninety minutes, the product gels after about thirteen days of storage. The pH at the end of the refluxing step is 6.47.

Example 5

202 parts of formalin are adjusted to pH 6.5 by addition of barium hydroxide. Then there are added 31.5 parts of melamine and the mixture refluxed for sixty minutes. The pH drops to 5.9.

Example 6

To 404 parts of formalin is added sufficient 2N sodium hydroxide solution to adjust the pH of the formalin to 8.9. There are then added 63 part of melamine and the mixture is refluxed for sixty minutes to prepare the primary reaction product. At the end of that time the pH is 5.9.

Example 7

A hydrophilic sol is obtained by refluxing a mixture containing 202 parts of formalin, 2 parts of 10% triethanolamine and 31.5 parts of melamine for sixty minutes.

Production of Stable Sirups

Example 8

To the hydrophilic sol as obtained in Example 1 are added 8.8 parts of guanadine carbonate and 84 parts of dicyandiamide. The entire mixture is reacted at 65° C. for about two and one half hours to produce a clear sirup which is neutralized by the addition of sufficient formic acid to give a pH of 7.3. A clear solution is obtained which remains stable over a long period of time without the formation of any precipitate even after several months of storage.

In this example the molecular ratio of the total ingredients is 2.7 mols of formaldehyde:1 mol of dicyandiamide:0.25 mol of melamine:0.05 mol of guanidine carbonate.

Example 9

To a hydrophilic sol, as produced in Example 2, 9 parts of guanidine carbonate and 84 parts of dicyandiamide are added and the reaction mixture is maintained at 65° C. for two and one half hours to produce a clear sirup which is neutralized by the addition of sufficient formic acid to give a pH of 7.2. This clear solution is substantially identical with that produced according to Example 1. The only substantial difference is that triethanolamine is utilized in place of the guanidine carbonate for the purposes of the pH adjustment of the formalin during the production of the hydrophilic sol.

Example 10

To the hydrophilic sol produced according to Example 6 there are added 168 parts of dicyandiamide and the entire mixture is reacted at 65° C. for about two and one half hours to produce a clear sirup which is neutralized by the addition of sufficient formic acid to give a pH of 7.2. It will be noted that the present example is virtually identical with the previous ones except that sodium hydroxide is utilized in place of guanidine carbonate and consequently a smaller amount of formaldehyde is used since an additional amount of formaldehyde is necessary in the previous examples in order to combine with the guanidine carbonate.

Example 11

To a hydrophilic product, obtained by the procedure of Example 1, 17.8 parts of guanidine carbonate, 220 parts of formalin, 31.5 parts of melamine and 168 parts of dicyandiamide are added and dissolved. The solution has a pH of 9.38 and the total mixture is allowed to react for two and one half hours at 65° C. After addition of formic acid in order to bring the mixture to pH 7.0 a stable sirup is obtained.

In this example only half of the total amount of melamine is condensed into a hydrophilic sol whereas the other part is reacted under those conditions which—without the hydrophilic sol—would result in a non-stable sirup, developing precipitates after only about one day of storage.

Example 12

8.8 parts of guanidine carbonate and 64 parts of dicyandiamide are added to the hydrophilic product obtained according to Example 1 and the mixture is reacted for two hours at about 65° C. Products which are stable for several months or more are obtained.

In this example the ratios of the reacting materials are as follows: 1 mol of dicyandiamide:0.33 mol of melamine:0.05 mol of guanidine carbonate:3.3 mols of formaldehyde.

Example 13

To the hydrophilic sol as obtained according to Example 3, are added 9 parts of guanidine carbonate, 40 parts of formalin, 84 parts of dicyandiamide and 31.5 parts of melamine. The pH of the resulting mixture is 8.32 and this mixture is reacted for two and one half hours at 65° C. After the addition of sufficient formic acid to bring the pH to 6.92, a clear, stable sirup is obtained.

In this example the ratios of the reacting materials correspond to 1 mol of dicyandiamide:0.5 mol of melamine:0.05 mol of guanidine carbonate:3.2 mols of formaldehyde.

Example 14

To the hydrophilic sol produced by the procedure of Example 7, 40 parts of formalin, 1 part of 2N sodium hydroxide, 84 parts of dicyandiamide and 35.1 parts of melamine are added. The pH is 8.30 and the reaction is allowed to proceed for two and one half hours at 65° C. After the addition of sufficient formic acid to bring the pH to 6.98, a stable sirup is obtained.

This example differs from the preceding one only insofar as the guanidine carbonate is omitted. The ratios of the reacted materials correspond to 1 mol of dicyandiamide:0.5 mol of melamine:3 mols of formaldehyde.

The hydophilic product of Example 4 may be used in the same general manner as the products of Examples 2 and 3, while the product of Example 5 may be used similarly to the products of Examples 6 and 7. Clear, stable sirups are also obtained utilizing the hydrophilic products of Examples 4 and 5.

Regulation of Viscosity of Sirups

In addition to stabilizing amino plastic resin sirups, another feature of my invention of particular importance is the regulation of the viscosity of amino plastic resin sirups by utilizing a hydrophilic melamine-aldehyde condensation product.

The following examples are given as illustrative of this aspect of my invention.

Example 15

31.5 parts of melamine are dissolved in 220 parts of formalin to which 2.2 parts of 10% triethanolamine have been added. The pH of the reaction mixture is 6.6. After refluxing for sixty minutes, 9 parts of guanidine carbonate and 84 parts of dicyandiamide are added and the reaction continued for two and one half hours at 65° C. After the addition of sufficient 10% formic acid to bring the pH to 7.0, the viscosity of the sirup is 37 centipoises.

Example 16

If the same procedure is used as in the preceding example, except that instead of 2.2 parts of 10% triethanolamine, 1.6 parts of 10% triethanolamine are added to 220 parts of formalin, the pH of the reaction mixture has a value of 6.3 (instead of 6.6 as in the preceding example). If all of the other reactants and conditions are kept identical with the preceding example, the resulting sirup has a viscosity of 69 centipoises.

The regulation of the viscosity of amino plastic resin sirups is of especial importance. For impregnation a sirup which is rather fluid is desirable in order that it may penetrate easily into the pores of the absorbent material. On the other hand if the resin sirup is to be used as an adhesive as for instance in the manufacture of plywood having a good hot water resistance or if such a sirup is to be used for the surface treatment of textiles, as for example, in glazing chintz, a highly viscous sirup is indicated. It has now been found as is evident from the preceding examples that small changes in the acidity of the reaction mixture containing melamine and aldehyde result in considerable differences in the viscosity of amino plastic resin sirups to which the hydrophilic sol is added. Accordingly a very convenient and reliable means of regulating the viscosity of amino plastic resin sirups is furnished by my process.

Furthermore the possibility of regulating viscosity is of great importance where other substances are to be added to the amino plastic resin sirup. Examples of such additive substances are: the starches, carbohydrates in any form, the proteinaceous substances such as casein, soybean protein, etc. These are especially useful in the field of adhesives as, for instance, in the manufacture of plywood, etc.

Generally speaking, I have found that my hydrophilic melamine-formaldehyde condensation products are best produced at a pH of about 6.0–6.5 and with a ratio of formaldehyde to melamine higher than 6:1. I have found that particularly good results are obtained with a ratio of around 10:1. In some instances it may be desirable to start the reaction at a pH higher than 7 but in this case the pH should be lowered for at least a substantial period during the refluxing operation. This may be achieved not only by the use of acid but also by prolonged heating, as well as by suitably regulating the amount of alkali initially added to the formaldehyde. By adjusting the pH by means of an effective buffer system such as formed by the addition of triethanolamine or diethanolamine, a practically constant pH value during the refluxing step is maintained.

Other aldehydes than formaldehyde or substances which yield formaldehyde may be used in place of the aqueous solution of formaldehyde used in the above examples, e. g. trioxymethylene, paraformaldehyde, etc.

In hardening or curing my resins containing dicyandiamide-formaldehyde condensation products, it is advantageous to have a compound present which is itself substantially neutral but which under the conditions of curing at relatively high temperature, develops a degree of alkalinity sufficient to catalyze or accelerate the curing and/or polymerization of the dicyandiamide-formaldehyde resins. This is accomplished in the examples set forth above by reacting an alkali, e. g. guanidine carbonate, triethanolamine, caustic soda, etc., with a volatile acid, e. g. formic acid, acetic acid, propionic acid, etc.

The stability of sirups containing amino plastics is of particular importance in the case of those applications where the utilization of the sirup is at a point different from and usually distant from the place of production of the sirups. The stability of the sirups is also important in many commercial processes wherein a delay in the completion of the finished products may be experienced.

Examples of the uses to which my stable products may be put are: laminating (paper, textiles, asbestos cloth, etc.), adhesives such as for water resistant plywood, textile treatment (particularly textile finishing), paper treatment, etc. My products are also especially useful in the production of lacquers, coating compositions, etc. Emulsions of my compositions may also be employed.

Generally the use of my hydrophilic melamine-aldehyde sols does not impair the curing properties of the amino-aldehyde resin to which it is added. As a matter of fact, in many instances products prepared according to the present process have very valuable properties and advantages which are not common to the amino-aldehyde resins which do not contain my hydrophilic sols. The advantages of combining minor proportions of melamine-aldehyde condensation products with dicyandiamide-aldehyde condensation products are pointed out more particularly in my copending applications Serial Nos. 311,935, filed December 30, 1939 (now Patent No. 2,286,228), 328,741, filed April 9, 1940 (now Patent 2,333,390), and 331,161, filed April 23, 1940 (now Patent No. 2,336,370).

By the term "hydrophilic sol" I mean a liquid composition where the colloidal dispersed phase possesses such a strong affinity for the dispersion medium that no separation occurs.

Obviously many modifications and variations in the processes and compositions described above may be made without departing from the spirit and scope of the invention as defined in the appended claims.

I claim:

1. A process which comprises refluxing a slightly acid mixture containing melamine and formaldehyde in the ratio of more than 6 mols of formaldehyde per mol of melamine, continuing the refluxing until there is formed a hydrophilic sol which acts as a protective colloid, adding dicyandiamide and an alkaline material to the sol and reacting this alkaline mixture at a temperature below the refluxing temperature until there is formed a clear, stable sirup, the sol containing reacted melamine equivalent to about 0.25–0.5 mol for each mol of dicyandiamide to be reacted.

2. A process which comprises refluxing a slightly acid mixture containing melamine and formaldehyde in the ratio of about 10 mols of formaldehyde per mol of melamine, continuing the refluxing until there is formed a hydrophilic sol which acts as a protective colloid, adding dicyandiamide and an alkaline material to the sol and reacting this alkaline mixture at a temperature below the refluxing temperature until there is formed a clear, stable sirup, the sol containing reacted melamine equivalent to about 0.25–0.5 mol for each mol of dicyandiamide to be reacted.

3. A process which comprises refluxing a slightly acid mixture containing melamine and formaldehyde in the ratio of more than 6 mols of formaldehyde per mol of melamine, the acidity of the mixture being maintained substantially constant by means of a buffer system, continuing the refluxing until there is formed a hydrophilic sol which acts as a protective colloid, adding dicyandiamide and an alkaline material to the sol and reacting this alkaline mixture at a temperature below the refluxing temperature until there is formed a clear, stable sirup, the sol containing reacted melamine equivalent to about 0.25–0.5 mol for each mol of dicyandiamide to be reacted.

4. A process which comprises refluxing a slightly acid mixture containing melamine and formaldehyde in the ratio of more than 6 mols of formaldehyde per mol of melamine, continuing the refluxing until there is formed a hydrophilic sol, adding dicyandiamide and an alkaline material to the sol and reacting this alkaline mixture at a temperature below the refluxing temperature until there is formed a clear, stable sirup, adding a volatile organic acid to neutralize the alkali, thereby producing a latent catalyst which will develop alkalinity upon subjection to further heat.

5. A process which comprises refluxing a slightly acid mixture containing melamine and formaldehyde in the ratio of more than 6 mols of formaldehyde per mol of melamine, continuing the refluxing until there is formed a hydrophilic sol which acts as a protective colloid, adding dicyandiamide, melamine and an alkaline material to the sol and reacting this alkaline mixture at a temperature below the refluxing temperature until there is formed a clear, stable sirup, the sol containing reacted melamine equivalent to about 0.25–0.5 mol for each mol of dicyandiamide to be reacted.

6. A clear, stable, aqueous sirup containing dicyandiamide-formaldehyde condensation products to which a hydrophilic melamine-formaldehyde aqueous sirup has been added and containing a salt of an alkali and a volatile organic acid.

7. A clear, stable, aqueous sirup containing dicyandiamide-formaldehyde condensation products to which a hydrophilic melamine-formaldehyde aqueous sol has been added as a protective colloid, the sirup containing reacted melamine equivalent to about 0.25–0.5 mol for each mol of reacted dicyandiamide.

8. A process which comprises reacting at about 65° C. dicyandiamide with an aldehyde in the presence of a melamine-aldehyde hydrophilic sol which acts as a protective colloid until there is formed a clear, stable sirup, the sol containing reacted melamine equivalent to about 0.25–0.5 for each mol of dicyandiamide to be reacted.

9. A process which comprises reacting at about 65° C. dicyandiamide with formaldehyde in the presence of a melamine-formaldehyde hydrophilic sol which acts as a protective colloid until there is formed a clear, stable sirup, the sol containing reacted melamine equivalent to about 0.25–0.5 for each mol of dicyandiamide to be reacted.

10. The process of claim 9 in which the reaction is carried out under alkaline conditions.

11. A process which comprises reacting at about 65° C. dicyandiamide and melamine with formaldehyde in the present of a melamine-formaldehyde hydrophilic sol which acts as a protective colloid until there is formed a clear, stable sirup, the sol containing reacted melamine equivalent to about 0.25–0.5 for each mol of dicyandiamide to be reacted.

KURT E. RIPPER.